United States Patent [19]

Uno et al.

[11] 4,181,411
[45] Jan. 1, 1980

[54] INDICATOR DEVICE USED IN CAMERA TO INDICATE EXPOSURE VALUES WITHIN A FINDER

[75] Inventors: Naoyuki Uno, Urawa; Tetsuji Shono, Saitama; Fumio Urano, Omiya; Masahiro Kawasaki, Tokyo, all of Japan

[73] Assignee: Asahi Kogaku Kogyo Kabushiki Kaisha, Tokyo, Japan

[21] Appl. No.: 934,747

[22] Filed: Aug. 21, 1978

Related U.S. Application Data

[63] Continuation of Ser. No. 619,124, Oct. 2, 1975, abandoned.

[30] Foreign Application Priority Data

Oct. 4, 1974 [JP] Japan .......................... 49/120083[U]

[51] Int. Cl.² .......................... G03B 7/08; G03B 17/20

[52] U.S. Cl. .......................... 354/53; 354/23 D; 354/38; 354/60 L

[58] Field of Search .......................... 354/24, 26, 29, 30, 354/36, 38, 53, 60 L, 23 D, 60 A

[56] References Cited

U.S. PATENT DOCUMENTS

| 3,895,875 | 7/1975 | Kitauva et al. | 354/53 |
| 3,896,460 | 7/1975 | Sahara et al. | 354/38 |
| 4,037,235 | 7/1977 | Veda | 354/38 |
| 4,140,380 | 2/1979 | Veda et al. | 354/53 |
| 4,150,889 | 4/1979 | Veda et al. | 354/53 |

Primary Examiner—Russell E. Adams
Attorney, Agent, or Firm—Sughrue, Rothwell, Mion, Zinn and Macpeak

[57] ABSTRACT

An apparatus to be used in a camera to digitally indicate inside the viewfinder, film exposure values based upon iris opening, shutter speed and film exposure index.

4 Claims, 7 Drawing Figures

INDICATOR DEVICE USED IN CAMERA TO INDICATE EXPOSURE VALUES WITHIN A FINDER

This is a continuation of application Ser. No. 619,124, filed Oct. 2, 1975, now abandoned.

BACKGROUND OF THE INVENTION

1. Field of the Invention

This invention relates generally to an indicator device for indicating exposure values in a camera within a viewfinder, and particularly to an indicator device used in a camera, in which distribution of the amount of APEX indication Bv of an object brightness B, the amount of APEX indication Sv of a film sensitivity S, the amount of APEX indication Av of iris A and the amount of APEX indication Tv of exposure time T is regularly programmed.

2. Description of the Prior Art

In the field of camera design it is common practice to include exposure meters in a camera housing. However, the meter readout is normally located outside the camera's viewfinder requiring the operator to remove the camera from the picture taking attitude to look at the exposure values. Additionally, if the indicator is in the middle of two values more time is needed to decide which of adjacent values is the correct reading and thus whether changes should be made to film, iris and/or shutter settings.

It is therefore an object of the present invention to provide an indication of the exposure value internal to the camera, which can be seen in the viewfinder by the camera operator.

A further object is to provide a digital indication such that the operator does not have to guess from a meter indication the amount of the exposure value setting.

SUMMARY OF THE INVENTION

According to the present invention, the foregoing and other objects are attained by the location of a light emitting diode indicator array in the viewfinder's field of view. One of the diodes is activated when the iris value and shutter exposure value according to the APEX system equals the representative figures for that iris and shutter speed setting in the viewfinder. The light emitting diode, next to the combination of iris and shutter speeds which are representative of the exposure value, will light and indicate which numerals are applicable for the existing camera conditions. The invention is characterized by digitally controlling light indicating segments to indicate exposure values in a viewfinder.

BRIEF DISCRIPTION OF THE DRAWINGS

DETAILED DESCRIPTION OF THE PREFERRED EMBODIMENT

Figure 1:
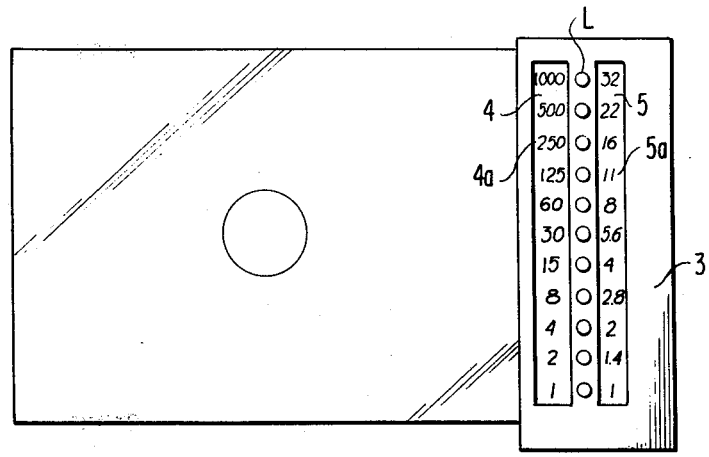
FIG. 1 is a, rear view of the inside of a viewfinder which includes the invention installed.

Referring now to the drawings, wherein like reference numerals designate identical parts throughout the several views. FIG. 1 shows the inside of a finder in a single lens reflex camera. Arranged on one side of the finder field and mounted on a mask 3 are plate 4, for indicating shutter speed values with a group of shutter speed values 4a indented therein, and plate 5 for indicating iris values with a group of iris values 5a indented therein. The plates are disposed so as to indicate respective values when one of a group of illuminating diode indicating segments L mounted between said indicating plates is lighted.

Figure 2:
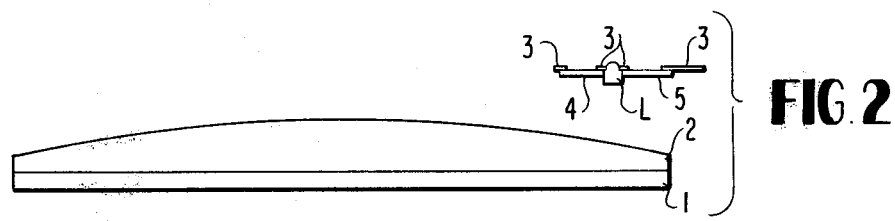
FIG. 2 is a schematic, bottom cross-sectional view of the apparatus in FIG. 1.
Figures 2A, 2B:
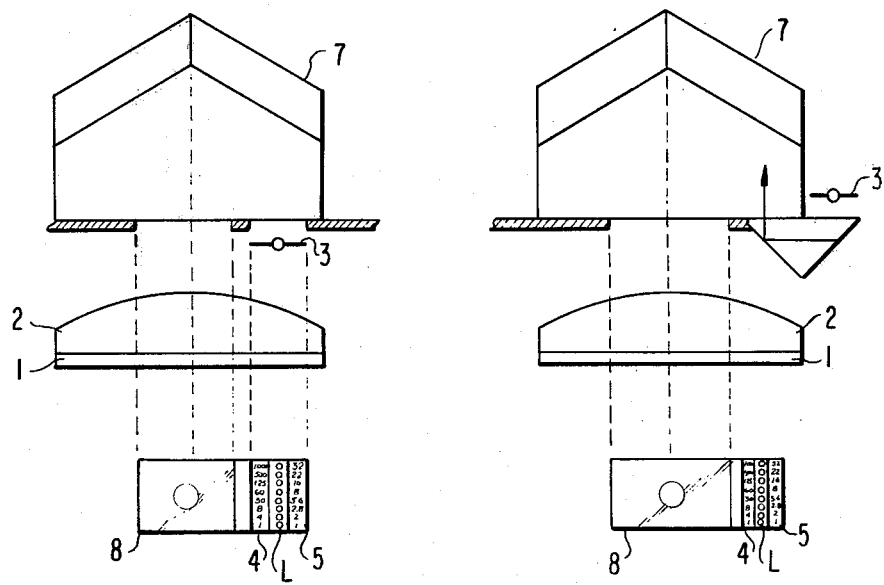
FIGS. 2A and 2B are alternative arrangements.

In FIG. 2, which is a cross sectional view of FIG. 1, the reference numeral 1 designates a focusing plate, 2 a condenser lens, and 3 the mask mounting located thereabove. The shutter speed value indicating plate 4, the iris value indicating plate 5 and the illuminating diode indicating segment L are mounted, so that a beam of light passed through an image lens and a quick return mirror, not shown, is focused at the focusing plate 1, and the groups of values 4a and 5a on the respective plates illuminated by the beam of light focused at the focusing plate 1 through a pentagonal roof prism (not shown), and an eyepiece can be viewed together with the finder field. As will be appreciated by anyone of ordinary skill in the art, there are numerous ways in which the mask 3, plate 4 and 5, and diodes L can be placed in the camera optical system so that the arrangement 3,4,5,L will appear superimposed on the edge of the viewfinder as the operator looks into the viewfinder lens. Two simple examples are shown in FIGS. 2A and 2B wherein like numerals represent the same elements as in FIGS. 1 and 2. Also shown are the prism 7 and viewfinder 8.

Figure 3:
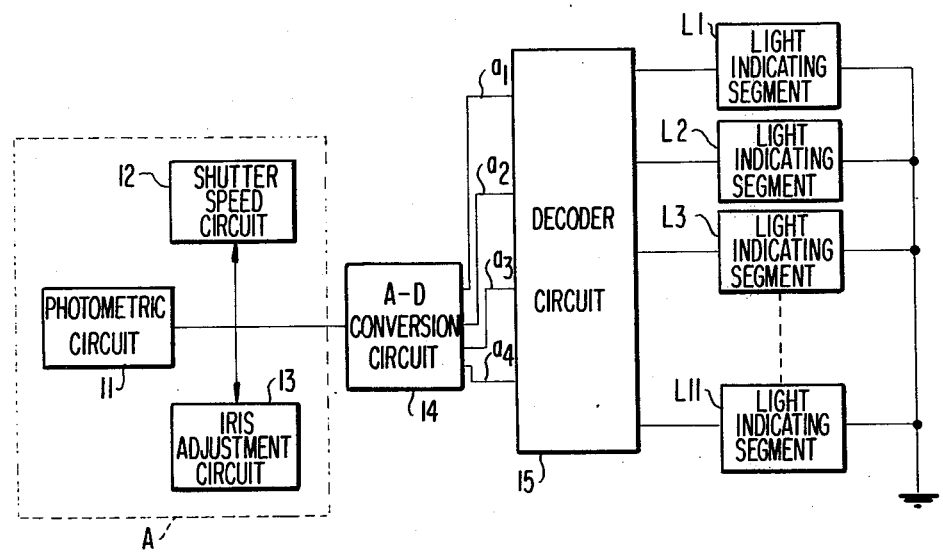
FIG. 3 is a block diagram of the invention.

In FIG. 3, information on object brightness B and on film sensitivity S are supplied to a photometric operational circuit block 11 by means of a photometric cell (now shown) mounted on an emission surface of the pentagonal roof prism (not shown) and by means of a film sensitivity conversion member (not shown) mounted on the camera, respectively. A shutter speed (ES) control circuit block 12 and an automatic iris adjustment (EE) control circuit block 13 are each controlled by output information from the photometric operational circuit block 11. An A-D conversion circuit block is indicated as 14 and serves to convert the analog output information of the photometric operational circuit block 11 into a digital signal. A decoder circuit block 15 is designed to control indicating segments $L_1$, $L_2$, ... $L_{11}$ by the digital signals $a_1$, $a_2$, $a_3$, and $a_4$.

The operation will now be described in detail referring to the above-described electrical circuit block diagram. In the photometric operational circuit block 11, the amount of APEX system indication Bv of the object brightness B and the amount of indication Sv of the film sensitivity S are operated upon and the information of Ev=Bv+Sv is the resultant output. The shutter speed (ES) control circuit block 12 and the iris adjustment (EE) control circuit block 13 are controlled in accordance with a program predetermined with respect to the value of the aforementioned operational equation. As is well known the relationships of the APEX system values for the exposure value Ev is:

$$Ev = Bv + Sv = Av + Tv.$$

In the actual circuit construction as indicated by the dotted line A which comprises the photometric operational block 11, the ES control block 12 and the EE control block 13 may variously be conceived as is well known to those skilled in the art.

The analog output of the photometric operational circuit block 11 is converted into digital signals $a_1$, $a_2$, $a_3$, $a_4$ by the A-D conversion circuit 14, and the lighting of indicating segments $L_1$, $L_2$, ... $L_{11}$ are controlled by the decoder circuit block 15.

Figure 5:
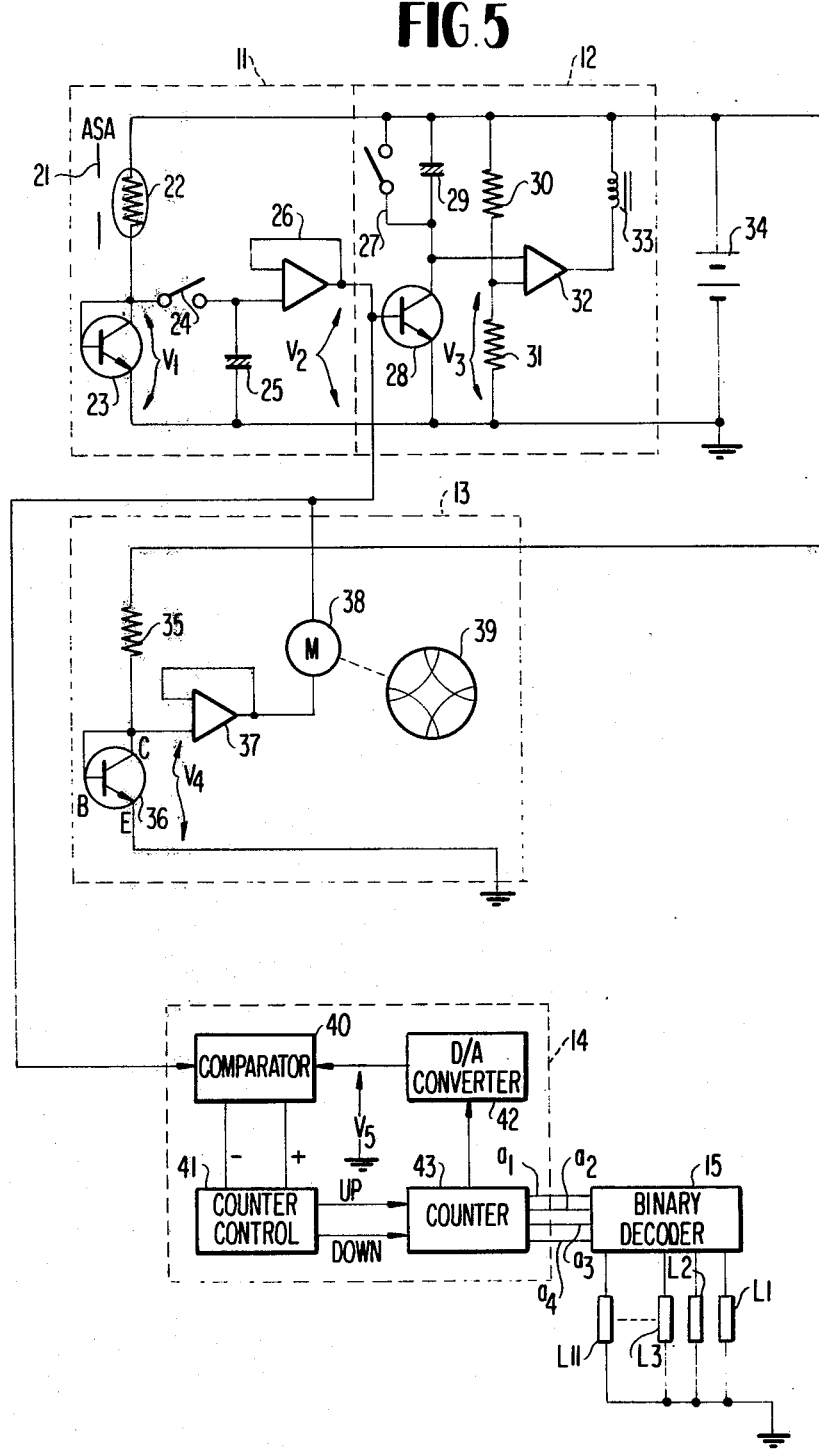
FIG. 5 is a schematic diagram of FIG. 3.

One example of circuitry for block 11, 12 and 13 is illustrated in FIG. 5 along with the conversion circuitry 14, 15 of FIG. 3. It will be understood by anyone of ordinary skill in the art that it is known in the camera art to provide (1) a circuit sensitive to film speed and brightness for generating a signal indicating the Ev value, (2) a circuit responsive to an Ev value for controlling the camera shutter speed, and (3) a circuit responsive to an Ev value for controlling the camera aperture or iris setting. One example is illustrated by units 11, 12 and 13 of FIG. 5.

The iris 21, positioned between the scene and a photoconductor 22, is set by the film speed adjustment. Consequently, the voltage $V_1$ across the base-emitter of transistor 23 is the exposure value Ev, i.e., it depends upon the APEX value of the film speed Sv and brightness Bv. The voltage corresponding to Ev is stored in condenser 25 via memory switch 24 and applied to an operational amplifier 26. The Ev value at $V_2$ is applied to the shutter control circuit 12, the aperture control circuit 13 and the display control circuitry 14, 15. The shutter speed control circuitry operates in a well known manner to control the shutter release electromagnet and therefore the shutter speed. Timing is controlled by charging condenser 29, voltage divider 30, 31 and comparator 32. The time it takes to charge condenser 29 via transistor 28 to a value equal to the voltage divider value is dependent upon the Ev voltage value, $V_2$.

Figure 4:
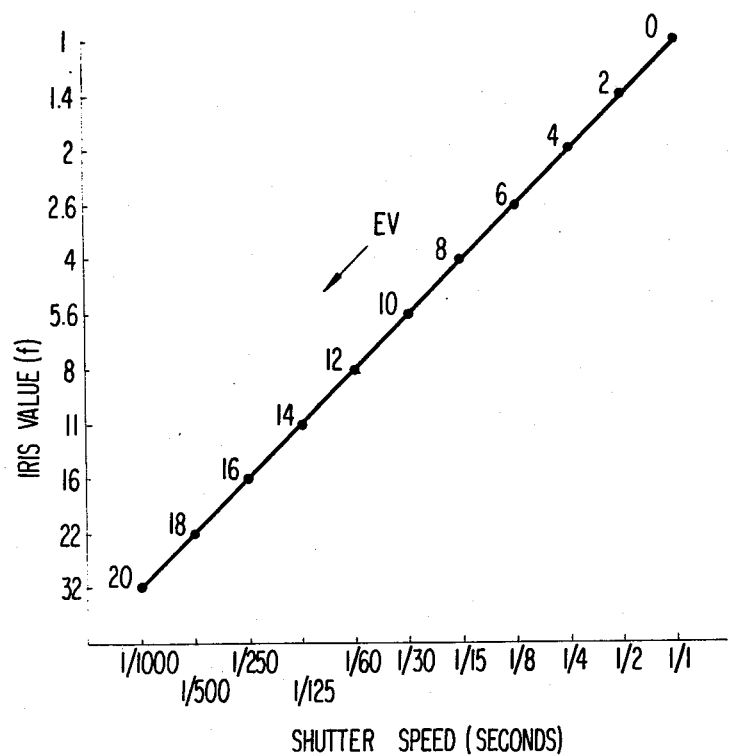
FIG. 4 is a graph of the iris setting versus shutter speed with the resultant exposure value line.

In the aperture control circuit, a motor 38 controls the opening of aperture 39 in dependence upon the value $V_2$- $V_4$, where $V_2$ is the Ev voltage and $V_4$ is a reference voltage set by power source 34, resister 35, diode connected transistor 36 and operational amplifier 37. The circuit parameters are adjusted as is well known to result in preferred aperture (f) and speed selection for a given Ev value, such as shown in FIG. 4. That is, the circuit is adjusted, for example, to set the aperture at an f value of 4 and a shutter speed of 1/15 when the Ev is 8.

The converter 14 of FIG. 3 is also shown in greater detail in FIG. 5. As shown it is a conventional type of A/D converter using digital to analog feedback. The input voltage, representing Ev, is compared with the feedback voltage $V_5$ which is generated by D/A converter 42 from the digital value in counter 43. The results of the comparison control the up and down counting of counter 43 via a counter control circuit 41 in a conventional manner to reduce the difference between the voltages applied to comparator 40. The four bit binary output from counter 43 is converted into a one-out-of N output (N=11 in the case illustrated) by a conventional binary decoder 15.

The relationship between the exposure value output (EV) of the photometric operational circuit block 11, the digital outputs $a_1$, $a_2$, $a_3$, $a_4$ of the A-D conversion circuit 14, and the light indicating segments $L_1$, $L_2$, ... $L_{11}$, is given by the following Table.

| EV | $a_1$ | $a_2$ | $a_3$ | $a_4$ | SEGMENT |
|---|---|---|---|---|---|
| 20 | 0 | 0 | 0 | 0 | $L_1$ |

-continued

| EV | $a_1$ | $a_2$ | $a_3$ | $a_4$ | SEGMENT |
|---|---|---|---|---|---|
| 18 | 0 | 0 | 0 | 1 | $L_2$ |
| 16 | 0 | 0 | 1 | 0 | $L_3$ |
| 14 | 0 | 0 | 1 | 1 | $L_4$ |
| 12 | 0 | 1 | 0 | 0 | $L_5$ |
| 10 | 0 | 1 | 0 | 1 | $L_6$ |
| 8 | 0 | 1 | 1 | 0 | $L_7$ |
| 6 | 0 | 1 | 1 | 1 | $L_8$ |
| 4 | 1 | 0 | 0 | 0 | $L_9$ |
| 2 | 1 | 0 | 0 | 1 | $L_{10}$ |
| 0 | 1 | 0 | 1 | 0 | $L_{11}$ |

FIG. 4 illustrates a graph of iris values (f) vs. shutter speed with the resultant exposure value (EV). For example, at an Exposure Value equal to 10, the shutter speed is 1/30 of a second and the iris value is f5.6. Since the circuit is so designed that when the $L_1$ goes on, the shutter speed is 1/1000 sec. and the iris value is f32, when the $L_2$ goes on, the shutter speed is 1/500 sec. and the iris value is f22, etc.. The shutter speed controlled by the ES control circuit block 12 and the iris value controlled by the EE control circuit block 13 are indicated within the finder field by the lighting of segments $L_1$, $L_2$, etc., respectively.

With the construction as described above, the indicator device according to the present invention can minimize the number of indicating elements representative of a combination of exposure values and simplify the electric circuit. Further, the iris values and the shutter speed values may be indicated at one place in a row and the positions of the illuminating elements relative to the values may be changed in response to the amount Bv of APEX indication of the object brightness B (or the amount of APEX indication of the film sensitivity S).

While the invention has been particularly shown and described with reference to preferred embodiments thereof, it will be understood by those skilled in the art that the foregoing and other changes in form and details may be made therein without departing from the spirit and scope of the invention.

What is claimed is:

1. A camera having an essentially rectangular viewfinder, a variable sized iris to control lens opening, a variable rate shutter to control the exposure time, an exposure system to provide an analog output signal based upon the brightness of the camera subject and film speed setting, a control circuit responsive to said output signal for simultaneously and automatically controlling both the iris size and the shutter speed, and a display means positioned within said camera to be seen through the viewfinder of said camera, said display means comprising a first array of visual indicators with alpha-numeric designations representative of the aperture opening values, a second array of visual indicators with alpha-numeric designations representative of the shutter speed values, said first and second arrays being juxtaposed within the viewfinder and arranged so that the visual indicators on said first array are adjacent to respective ones of the visual indicators on said second array, each pair of visual indicators composed of one indicator from said first array and the adjacent indicator from the second array corresponding to a different exposure value according to a predetermined pattern of exposure values, and means responsive to said output signal for selectively illuminating a single pair of said visual indicators composed of one indicator from said first array and the adjacent indicator from said second array which corresponds to the exposure value of the iris size and shutter speed controlled by said control circuit.

2. A camera as recited in claim 1, wherein said means for selectively illuminating comprises a third array comprised of light emitting diodes positioned between said first and second arrays.

3. A camera as recited in claim 2, further comprising a conversion circuit connected to receive said analog output signal from said exposure system and producing a corresponding digital output signal, and a decoder circuit connected to receive said digital output signal and in response thereto to selectively energize one of said light emitting diodes in said third array thereby selectively illuminating said single pair of visual indicators composed of one indicator from said first array and the adjacent indicator from said second array corresponding to the exposure value measured by said exposure system.

4. A camera as recited in claim 2, wherein said first, second and third arrays are oriented parallel to one side of the viewfinder with the alpha-numeric designations representative of the aperture opening values positioned adjacent to and to one side of respective ones of said light emitting diodes and the alpha-numeric designations representative of the shutter speed values being positioned adjacent to and on the other side of respective ones of said light emitting diodes.

* * * * *